US009317907B2

(12) United States Patent
Cauchy et al.

(10) Patent No.: US 9,317,907 B2
(45) Date of Patent: Apr. 19, 2016

(54) METHOD AND SYSTEM FOR CORRECTING A DIGITAL IMAGE BY GEOMETRIC ADJUSTMENT OF THIS IMAGE ONTO A REFERENCE IMAGE

(71) Applicant: ASTRIUM SAS, Suresnes (FR)

(72) Inventors: Arnaud Cauchy, Sophia Antipolis (FR); Thierry Poglio, Sophia Antipolis (FR); Alexandre Robin, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 0 days.

(21) Appl. No.: 14/346,471

(22) PCT Filed: Sep. 24, 2012

(86) PCT No.: PCT/EP2012/068740
§ 371 (c)(1),
(2) Date: Mar. 21, 2014

(87) PCT Pub. No.: WO2013/041717
PCT Pub. Date: Mar. 28, 2013

(65) Prior Publication Data
US 2014/0328545 A1    Nov. 6, 2014

(30) Foreign Application Priority Data

Sep. 23, 2011  (FR) ..................... 11 02900

(51) Int. Cl.
*G06K 9/68*    (2006.01)
*G06T 5/00*    (2006.01)
(Continued)

(52) U.S. Cl.
CPC .......... *G06T 5/006* (2013.01); *G06F 17/30244* (2013.01); *G06K 9/6202* (2013.01); *G06T 1/20* (2013.01)

(58) Field of Classification Search
None
See application file for complete search history.

(56) References Cited

U.S. PATENT DOCUMENTS 7,379,614 B2 * 5/2008 Cho et al. ................. 382/255

OTHER PUBLICATIONS

Patrick E. Brownsword et al.; The Meridian II Database and Software Toolkit for the Construction of Geographic Information Processing Systems; The Canadian Conference on GIS-91 Proceedings: National Conference, Mar. 18-22, 1991, Ottawa, Canada, Mar. 18, 1991, pp. 673-693, XP009158481, 3.1.2 Client Server Architecture, figures 3-3.

(Continued)

*Primary Examiner* — Daniel Mariam
(74) *Attorney, Agent, or Firm* — Bachman & LaPointe, P.C.

(57) ABSTRACT

The present invention concerns a method for correcting a digital image stored by a client device by geometric adjustment of this image onto a reference image stored by a server device connected to the client device by a communication network. The method is characterized in that it includes the following steps:
  obtaining, by the server device, at least one area of interest of the reference image,
  sending, to each client device, each area of interest,
  obtaining, by the client device, part of the image delimited by each received area of interest, said image part being either a part of the image to be corrected or a part of an image resulting from the image to be corrected,
  sending, to the server device, each image part thus obtained,
  determining, by the server device, parameters of the correction to apply to the image to be corrected, said parameters being determined by geometric adjustment of said received at least one image part onto the reference image,
  sending, to the client device, the parameters thus determined, and
  applying, by the client device, the correction of the image to be corrected, said correction using firstly the received parameters and secondly a ground elevation model corresponding to this image to be corrected.

20 Claims, 3 Drawing Sheets

(51) Int. Cl.
  *G06T 1/20* (2006.01)
  *G06F 17/30* (2006.01)
  *G06K 9/62* (2006.01)

(56) References Cited

OTHER PUBLICATIONS

Kenneth A. Hawick et al.; Distributed frameworks and parallel algorithms for processing large-scale georgraphic data; Parallel Computing, Elsevier Publishers, Amsterdam, NL, vol. 29, No. 10, Oct. 1, 2003, pp. 1297-1333, XP004460600.

Weirong Chen et al.; A Comprehensive Study on Urban True Orthorectification; IEEE Transactions on Geoscience and Remote Sensing, IEEE Service Center, Piscataway, NJ, US, vol. 43, No. 9, Sep. 1, 2005, pp. 2138-2147, XP011138222.

Lukas Zebedin et al.; Towards 3D map generation from digital aerial images; ISPRS Journal of Photogrammetry and Remote Sensing, Amsterdam: Elsevier, Amsterdam, NL., vol. 60, No. 6, Sep. 1, 2006, pp. 413-427, XP005634854.

* cited by examiner

METHOD AND SYSTEM FOR CORRECTING A DIGITAL IMAGE BY GEOMETRIC ADJUSTMENT OF THIS IMAGE ONTO A REFERENCE IMAGE

BACKGROUND

The present invention concerns a method for correcting a digital image stored on a client device by geometric adjustment of this image onto a reference image stored on a server device connected to the client device by a communication network. It also concerns a client/server system that implements this image correction method, signals exchanged between the client and server devices, and a computer program.

During the past few years, the volume of image data has considerably increased, in particular because of the technical changes in network infrastructures and an increase in the number of sensors.

The commercial exploitation of these data has led, firstly, to the direct sale of products such as for example satellite or aerial images that have been orthorectified from ground elevation models.

For this purpose, client/server applications of the centralised type have been developed. These applications consist mainly of centralising the execution of the image correction methods on the server device. The user then has to send a request, via a client device and to this server device, transferring to it the whole image to be corrected via a communication network. The image, once corrected, is then transferred to the client device via the communication network.

The present invention is limited to the correction of a digital image by geometric adjustment of this image onto a reference image.

There exist many ways for correcting a digital image by geometric adjustment of this image onto a reference image.

One of them, which is given here only by way of example, is orthorectification. This type of correction is normally applied to a satellite or aerial image for correcting the spatial distortions or inaccuracies that are due notably to:

the angles at which these images are taken and the slopes of the relief, which cause pixel positioning errors, imprecise knowledge of the location of the imaging system.

Orthorectification of an image is a transformation of this image where the result is an image, normally referred to as orthoimage, that is corrected geometrically so that all its points correspond to points on the terrestrial surface that would have been acquired by a sensor located at infinity, and at their vertical position. Because an orthoimage therefore has the geometry of a flat map, thematic data resulting from this orthoimage, such as spatial information, can then be extracted more precisely compared with information directly resulting from a raw satellite or aerial image.

Orthorectification of a satellite or aerial image can be implemented by determining rational polynomial coefficients (RPCs). These polynomials establish a modelling of the relationship between the positions of the pixels of the image to be corrected and the positions of points on the terrestrial surface the three spatial coordinates of which are perfectly known. These points on the terrestrial surface are normally referred to as ground control points (GCPs) and are stored by the server in association with the reference image.

One example of rational polynomials is given by equation (1):

$$\begin{cases} r_n = \dfrac{P_1(x_n, y_n, z_n)}{P_2(x_n, y_n, z_n)} \\ c_n = \dfrac{P_3(x_n, y_n, z_n)}{P_4(x_n, y_n, z_n)} \end{cases} \quad (1)$$

with $r_n$ and $c_n$ the positions of the row and respectively the column of a pixel of the image to be corrected, $(x_n, y_n, z_n)$ the three-dimensional coordinates of a position of a point on the terrestrial surface, $P_1$ and $P_2$ polynomials corresponding to the numerator and denominator of a first rational polynomial and $P_3$ and $P_4$ polynomials corresponding to the numerator and denominator of a second rational polynomial. It is usual for the first rational polynomial to be used for calculating the positions of the rows of the pixels and the second to be used for calculating the positions of the columns of these pixels.

Each polynomial P of a numerator or denominator is for example given by:

$$P(x, y, z) = \sum_{i=0}^{m_1} \sum_{j=0}^{m_2} \sum_{k=0}^{m_3} a_{ijk} x^i y^j z^k \quad (2)$$

with $a_{ijk}$ the coefficients of the rational polynomials.

These coefficients of the rational polynomials are calculated from an image to be corrected and a reference image. In practice, a reference image is usually an image previously taken that has undergone processing operations such as an orthorectification or on which any cloud has been removed and/or any part that represents an area of water has been identified.

Ground control points are then extracted from this reference image and the coefficients of the two rational polynomials are calculated by solving a system formed from equation (2), that is to say from these control points and the image to be corrected.

Once the coefficients of the rational polynomials have been calculated, the server device applies the polynomial transformation defined by equation (1) in order to determine the corrected position of each pixel of the image. The orthoimage is then obtained by recovering the altitude of the pixels of this orthoimage from a ground elevation model.

A radiometric correction may also be applied by the server device to the orthoimage in order to correct colorimetric contrast errors. The orthoimage is then sent to the client device.

Orthorectification of a satellite or aerial image is only one example of correction. This is because a user may expect a geographical positioning of his image on the terrestrial globe only, meaning positioning in terms of latitude and longitude of his image on the corresponding point on the terrestrial surface, without wanting an orthoimage. However, in this case, the whole image to be corrected must also be transferred to the server device and the corrected image must also be sent by the server device to the client device.

This type of centralised application cannot be used for a large-scale deployment since it requires a large bandwidth for transferring the images to be corrected and those that have been corrected between the server device and the client device. For example, the time taken for obtaining a corrected satellite and/or aerial image is very often around several hours, which is unacceptable for a wide deployment of this type of service. Reducing the quality of the images to be corrected is not a solution that can be foreseen for reducing this waiting time since the degradation of the image to be corrected greatly interferes with the parameters of the correction to be applied to this image such as for example the coefficients of the rational polynomials. The result is then a quality of the corrected image which does not, for the majority of the time, correspond to user's expectations.

Moreover, on the server side, the resources used for correcting an image, for instance satellite or aerial, are quite sizable and these resources increase according to the number of simultaneous accesses to the image correction service. This cost related to these resources will have an influence on the access price to this service leading this price to increase exponentially. This runs against the willingness of the service providers to deploy this service to the general public.

SUMMARY

The problem addressed by the present invention is therefore to allow the application of a correction of a digital image stored by a client device, by geometric adjustment of this image onto a reference image stored on a distant server device, while minimising the bandwidth required for applying this correction to the image and preserving a quality of the corrected image comparable to the one obtained by a centralised application of this correction to the image as described above.

To this end, in general terms, the present invention solves this problem by transferring from the client device to the server device only the parts of the image to be corrected rather than the whole of this image, and then transferring to the client device only the parameters of the correction to be applied to this image and transferring the application of this correction to the client device.

The transmission of the image parts and the parameters of the correction greatly minimises the bandwidth between the server and the client while the transfer of the application of the correction to the image to be corrected enables the server to provide simultaneous multiple access to the image correction service without a significant increase of hardware resources as it is the case in centralised applications.

According to one of its aspects, the present invention concerns a method for correcting a digital image stored on a client device by geometric adjustment of this image onto a reference image stored on a server device connected to the client device by a communication network. The method is characterised in that it includes the following steps:

obtaining, by the client device, at least one area of interest of the reference image, sending, to each client device, each area of interest, obtaining, by the client device, part of the image delimited by each received area of interest, said image part being either a part of the image to be corrected or a part of an image resulting from the image to be corrected, sending, to the server device, each image part thus obtained, determining, by the server device, parameters of the correction to apply to the image to be corrected, said parameters being determined by geometric adjustment of said received at least one image part onto the reference image, sending, to the client device, the parameters thus determined, and applying, by the client device, the correction of the image to be corrected, said correction using firstly the received parameters and secondly a ground elevation model corresponding to this image to be corrected.

The method solves the technical problem disclosed above since it allows the deployment of an online service that is attractive to the largest number of users because of the small bandwidth required between the client device and the server device. This is because only one, or even several, image areas of interest, meaning information that delimits one or even several parts of the plane of the image to be corrected (or of an image resulting from the image to be corrected) are transmitted to the server instead of the whole of this image as is the case in the prior art. In addition, the image, once corrected, does not have to be transmitted from the server device to the client device because this image is corrected by the client device. The inventor thus observed that the method allows a reduction of around 99% of the bandwidth required by the current centralised digital image correction applications and a computing time of a few minutes instead of a computing and transfer time of around several hours required by these centralised applications.

Moreover, this method prevents the resources of the server increasing exponentially according to the number of client devices simultaneously accessing this online service, since the resources of the each client device are used for applying the correction of the image rather than the resources of the server device as it is the case in the prior art.

According to one embodiment, at least one area of interest is obtained from a memory of the server or received via the communication network.

This embodiment reduces the latency time on the server side since it avoids the time required for defining this area of interest, which was then precalculated and stored.

According to one embodiment, at least one area of interest is an area defined around a point, referred to as the point of interest, which was previously identified on the reference image following the application of a processing to this image.

According to one embodiment of the method, the reference image is selected from a plurality of reference images or extracted from a reference mosaic stored in a memory accessible to the server device and from metadata sent by the client device and received by the server device.

A reference mosaic is the result of the assembling of a plurality of images that have been previously taken and that have been processed. The reference mosaic enables, if it is sufficiently rich, to cover a large part of the terrestrial surface, allowing to correct any satellite and/or aerial image of the terrestrial surface when this mosaic covers the whole terrestrial globe. Using such a reference mosaic an online service can then respond to any user request.

According to one embodiment, the metadata define, among other things, information relating to the image to be corrected and characteristics of the sensor that was used to acquire this image to be corrected.

According to one embodiment, the geometric adjustment of the image to be corrected onto the reference image consists of applying a polynomial transformation to this image I, and the parameters of the correction are then the polynomial coefficients of this transformation that are determined by adjusting said received at least one part of the image onto the reference image.

According to one embodiment, the polynomial coefficients are also determined by using ground control points that correspond to the points of interest.

The number of ground control points is a key parameter for the geometric adjustment of the image parts to be corrected, onto the reference image to be optimal.

According to this embodiment, the number of ground control points is equal to the number of points of interest. Thus, if the number of points of interest is small, then the bandwidth required for transferring the image parts will be small, but it may then happen that the geometric adjustment of the image is not good enough to obtain a required quality of the corrected image. Increasing the number of points of interest, typically a few thousand, cannot then be foreseen to increase the quality of the correction, since the number of image parts to be transferred and therefore the bandwidth then increase significantly. This embodiment is therefore unsuitable in the case where the correction to be applied to the image is an orthorectification that requires a large number of control points for obtaining an adequate quality of the orthoimage. On the other hand it is suitable, for example, if the correction is a simple geometric adjustment of the image to the terrestrial globe without correction of the positions of the pixels of the image to be corrected.

In order to optimise the trade-off between bandwidth and quality of the corrected image, the number of points of interest is separated from the number of ground control points used for the geometric adjustment.

To this end, according to one embodiment, the polynomial coefficients are also determined using ground control points that relate to points extracted from each image part received from the client device.

This embodiment is therefore advantageous for calculating an orthoimage, since it makes it possible to choose a relatively small number of points of interest, in order to minimise the number of image parts to be transferred, and a relatively large number of ground control points, typically a few thousand, to obtain a satisfactory quality of the corrected image. This embodiment thus optimises the trade-off between a good geometric adjustment of the image onto the reference image and a small bandwidth, since it separates the number of control points that defines the number of parts of the image to be transmitted from the number of ground control points that are used for calculating the orthoimage.

According to one embodiment, the number of control points and/or the size of the areas of interest is/are constrained by the characteristics of the sensor that was used to acquire the image to be corrected.

This embodiment makes it possible to adapt the method to image sensors of various types. It makes it possible in particular to know, on the server side, what is represented by each pixel of the image to be corrected in the reference frame of the reference image.

According to one embodiment, the polynomial transformation is an orthorectification.

According to one embodiment, the ground elevation model that corresponds to the image to be corrected is obtained by the client device from a local memory.

Local storage of the ground elevation model avoids this model being transmitted between the server and the client, thus limiting the bandwidth and therefore the duration of the method, and improves the confidentiality of this model.

According to one embodiment, the ground elevation model that corresponds to the image to be corrected is obtained following the reception of a signal sent by the server device.

The reception of a signal carrying the ground elevation model enables a client device to be able to geometrically correct the image to be corrected even if this client device has not locally stored a ground elevation model. This variant is therefore advantageous since it avoids a memory space being reserved by the client device in order to store this ground elevation model in advance.

According to this last embodiment, the ground elevation model is preferably transmitted in encrypted form for confidentiality reasons.

According to one embodiment, each area of interest is sent to the client device as soon as it has been obtained by the server device.

This embodiment enables obtaining/sending areas of interest to be put in parallel and therefore reduces the duration of the method. Longer is the time taken for obtaining an area of interest, better is this reduction of duration. Thus this embodiment has an advantage when each area of interest is defined around a point of interest that must be extracted from the reference image.

According to one embodiment, at least one point of interest and/or at least one area of interest is/are defined manually by a user.

This embodiment is particularly advantageous in the case of an online service since it provides the possibility for a user to select the points of interest and/or the areas of interest that are most relevant on the reference image, for the purpose of improving the quality of the corrected image. These points of interest and/or areas of interest may, according to a variant, be supplemented by the server device, which extracts, or obtains from a memory, other points of interest and/or areas of interest.

According to one embodiment, the number of ground control points and/or the number of areas of interest is/are a parameter chosen by the user.

This embodiment is particularly advantageous since it enables the user to choose a trade-off between the waiting time to obtain a corrected image and the quality of this corrected image. Greater will be the number of points of interest (or area of interest), longer will be the computing time required and better will be the correction of the image; and, vice versa, smaller will be this number of points of interest (or areas of interest), shorter will be the computing time and lower will be the quality of the corrected image.

According to another of its aspects, the present invention concerns a signal received by a client device during a method for correcting a digital image stored on this client device by geometric adjustment of this image to a reference image stored on a server device connected to the client device by a communication network. The signal is characterised in that its frame includes information that represents at least one area of interest of the reference image.

According to another of its aspects, the present invention also concerns a signal received by a server device during a method for correcting a digital image stored on a client device connected to the server device via a communication network, the correction of the digital image being achieved by geometric adjustment of this image onto a reference image stored on the server device. The signal is characterised in that its frame includes information that represents at least part of the image to be corrected, which is delimited by an area of interest of the reference image, or a part of an image resulting from the image to be corrected and that is delimited by an area of interest of the reference image.

According to its hardware aspects, the present invention concerns a system for correcting a digital image by geometric adjustment of the image onto a reference image. The system including a server device on which the reference image is stored and a client device on which the image to be corrected is stored, the server and client devices being connected together by a communication network, the system is characterised in that the server device includes means for obtaining at least one area of interest of the reference image, means for sending a signal the frame of which includes information for representing at least one area of interest of the reference image, means for receiving at least one image part, said image part being either a part of the image to be corrected or a part of an image resulting from the image to be corrected, means for determining parameters of the correction to apply to the image to be corrected, said parameters being determined by geometric adjustment of received at least one image part onto the reference image and means for sending parameters thus determined. The client device includes means for receiving a signal the frame of which includes information for representing at least one area of interest of the reference image, means for obtaining at least part of the image to be corrected that is delimited by an area of interest of the reference image or a part of an image resulting from the image to be corrected and that is delimited by an area of interest of the reference image, means for sending a signal carrying at least one image part thus obtained, means for receiving a signal carrying parameters of the correction to be applied to the image to be corrected and means for applying the correction of the image to be corrected, said correction using firstly the received parameters and secondly a ground elevation model corresponding to this image to be corrected.

The invention also concerns a computer program that can be stored on a medium and/or downloaded from a communication network in order to be read by a computer system or a processor. This computer program includes instructions for implementing the method mentioned above, when said program is executed by one or even several device processors.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION

Figure 1:
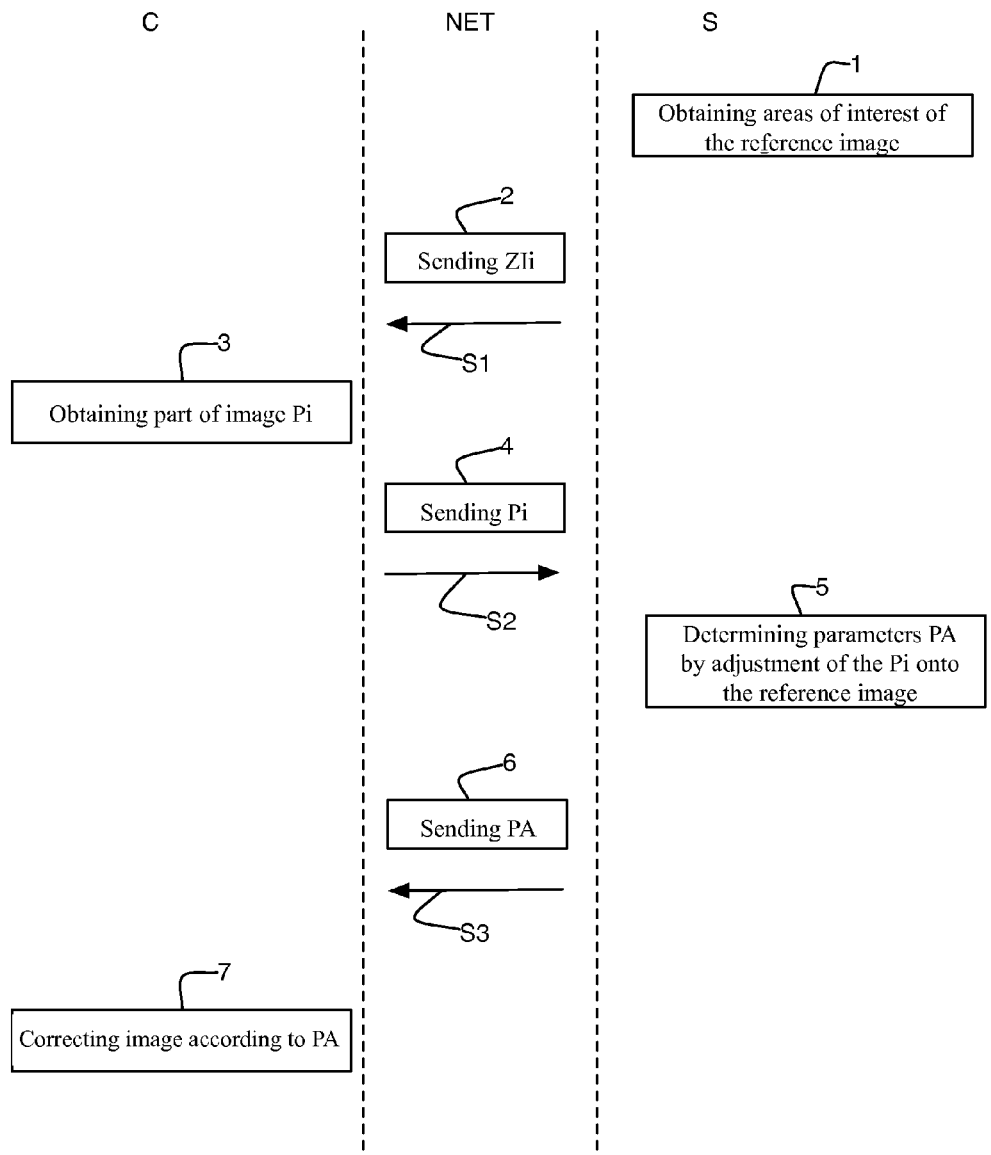
FIG. 1 schematically shows a diagram of the steps of a method for correcting a digital image stored on a client device by geometric adjustment of this image onto a reference image stored on a server device connected to the client device by a communication network.

FIG. 1 schematically shows a diagram of the steps of the method for correcting a digital image I stored on a client device C by geometric adjustment of this image I to a reference image IR stored on a server device S connected to the client device C by a communication network NET.

The method includes a step 1 of obtaining, by the server device S, at least one area of interest $ZI_i$ of the reference image IR, a step 2 of sending, to each client device C, each area of interest $ZI_i$ a step 3 of obtaining, by the client device C, an image part $P_i$ delimited by each received area of interest $ZI_i$.

According to one embodiment, each image part $P_i$ is a part of the image to be corrected I, meaning a set of information that represents pixels of this image I the number of which is less than total number of pixels of this image.

According to a variant, each image part $P_i$ is a part of the image ID resulting from the image I to be corrected. This image ID is the resultant of the application of a processing to the image I such as for example a filtering of the details of the image I or an edge sharpening of this image I.

The method also includes a step 4 of sending, to the server device S, each image part $P_i$ thus obtained, a step 5 of determining, by the server device S, parameters PA of the correction to apply to the image I to be corrected, the parameters PA being determined by geometric adjustment of said received at least one image part PI onto the reference image IR, a step 6 of sending, to the client device C, the parameters PA thus determined and a step 7 of applying, by the client device C, the correction of the image I to be corrected, said correction using firstly the received parameters PA and secondly a ground elevation model corresponding to this image to be corrected I.

According to one embodiment, at least one area of interest $ZI_i$ is obtained from a memory of the server or received via the communication network NET.

According to one embodiment, at least one area of interest $ZI_i$ is an area defined around a point $PI_i$, referred to as point of interest, which was previously identified on the reference image IR following the application of a processing to this image IR. The points of interest are preferably distributed uniformly over the plane of the reference image IR.

According to one embodiment, the processing for extracting points of interest is a contrast detector. A point of interest $PI_i$ then corresponds to an area of high contrast such as in particular the intersection of roads. Contrast detectors are widely known in the literature. Moreover, other processing operations maybe applied to the reference image IR in order to extract points of interest $PI_i$, such as contour detectors or other singular point detectors. The method is not related to any particular point detector and the scope of the invention extends to all types of detector that make it possible to extract points from the reference image IR.

According to one embodiment of the method, the reference image IR is selected from a plurality of reference images or from a reference mosaic stored in a memory accessible to the server device S and from metadata sent by the client device C and received by the server device S.

According to one embodiment, the metadata define, among other things, information relating to the image I to be corrected, such as its ground footprint, or its number of rows and columns. This information makes it possible to define the dimensions of the reference image. The metadata also optionally define the number of spectral components of the image I. Thus, when the spectral components of the image I are not perfectly adjusted to each other, the method will be applied independently to each of these spectral components; otherwise it will be applied to a single spectral band. In the latter case, the parameters of the correction thus determined will be used to geometrically correct all the spectral bands.

The metadata also define characteristics of the sensor that was used for acquiring this image I to be corrected. These characteristics define in particular the approximate geographical position of the sensor when the image I to be corrected is acquired. This information makes it possible to determine the extent of the terrestrial surface that has been imaged by the sensor and therefore what is the reference image that must be selected from the plurality of reference images or extracted from a reference mosaic.

According to one embodiment, the geometric adjustment of the image to be corrected I onto the reference image IR consists of applying a polynomial transformation to this image I. The parameters PA are then the coefficients of this transformation that are determined by adjusting said received at least one image part $P_i$ onto the reference image IR. Thus, if several image parts $P_i$ are received by the server device S, coefficients of the transformation of the image I can be calculated from each of these image parts or, in a variant, a single set of coefficients can be calculated by considering all these image parts.

According to one embodiment, the polynomial coefficients PA are determined by using ground control points $PCT_i$ that correspond to the points of interest $PI_i$.

According to another embodiment, the polynomial coefficients PA are determined using ground control points that relate to points extracted from each image part $P_i$ received from the client device C.

The ground control points can be extracted, for example, using a method for extracting points of interest from an image, examples of which were given above.

According to one embodiment, the number of control points and/or the size of the areas of interest is/are constrained by the characteristics of the sensor that was used to acquire the image to be corrected.

In practice, a heuristic is defined according to the characteristics of the sensor. For example, this heuristic defines the number of points of interest and the size of the areas of interest defined around these points according to the number of rows and columns, and the sampling step on the ground of the image to be corrected. This heuristic therefore makes it possible to adapt the number of points of interest and the number of areas of interest to the characteristics of sensors of various types.

According to one embodiment, the polynomial transformation is an orthorectification.

Rational polynomials are used to determine the position of the rows and columns of the pixels of the image I to be corrected as explained in the introductive part in relation to equations (1) and (2). The polynomial coefficients are then calculated by resolution of a system formed from equation (2) in which the pixels belong either to only one of the image parts $P_i$ or to all these image parts if a single set of coefficients is used for correcting the image I.

According to one embodiment, the ground elevation model that corresponds to the image to be corrected I is obtained by the client device C or from a local memory or following the reception of a signal sent by the server device S.

According to one embodiment, each area of interest $ZI_i$ is sent during step 2 as soon as it has been obtained by the server device S.

According to one embodiment, at least one point of interest and/or at least one area of interest is/are defined automatically.

According to one embodiment, additional points of interest and/or areas of interest can be manually added and/or deleted by a user.

According to one embodiment, the number of ground control points or the quality of the corrected image is a parameter chosen by the user.

A user can then, from this embodiment, choose initially a small number of ground control points (or a minimum quality threshold for the corrected image) and, if he finds that the quality of the corrected image is not good enough, reiterate the method with a larger number of ground control points (or with a higher quality threshold). Thus an online service using this method is advantageous since it enables the provider of this service to offer a pricing for this online service that depends on the quality of the corrected image.

According to one embodiment relating to the deployment of an online service, the method begins following the reception, by the server device S, of a request sent by the client device C. This request can, according to one embodiment, carry metadata, such as a ground footprint, that will enable the server device S to select the reference image from a plurality of reference images or to extract a reference image from a reference mosaic.

The correction methods described above can be used in the context of an online service using a digital-image processing. In particular, these correction methods can be used in an online service than enables a True-OrthoImage of an imaged area to be generated from at least two images of this area, referred to as source images, which are stored by this client device.

True-OrthoImage is a term widely known in the art for designating an orthoimage in which occlusion area no longer exists. Moreover, the principle of the generation of a true orthoimage is to have available several source images of the same area seen with different and complementary angles of incidence, so that, during orthorectification, each pixel of the generated True-OrthoImage comes from the source image having the most relevant, meaning the most "vertical" possible, angle of sight. In this regard, a True-OrthoImage can be considered to be a mosaic, since it is generated from several different source images. The True-OrthoImage is generally produced on urban areas in order to avoid artefacts related to the occlusions of high buildings. The degree of overlap between the source images is in practice often greater than or around 80%. It is therefore necessary during generation that the source images have been acquired under similar illumination conditions (same day, same weather, little difference between each acquisition). Moreover, a True-OrthoImage must not be confused with a mosaic of orthoimages, which is generally produced when there exists little overlap between the images (typically less than 20%), and which requires a mosaic line ("cutline") as well as, usually, a radiometric harmonisation of colours.

When the True-OrthoImage is generated, it is necessary to adjust the source images geometrically. For this purpose, according to the present invention, the client device C sends, to the server device, metadata of each source image, in particular the footprints on the ground. The server device S obtains the reference image and the areas of interest on this reference image. The same area of interest may be obtained for several source images. The client device C then obtains an image part of each source image per area of interest and sends each of these image parts to the server device S. The server device S then determines correction parameters, in this case polynomial coefficients (RPCs), for each source image so that each source image is geometrically adjusted onto the reference image and the source images are adjusted to each other. The server device S then sends these correction parameters to the client device C, which then applies the correction to each of the source images, in order to generate a True-OrthoImage from these source images then geometrically corrected.

Figure 2:
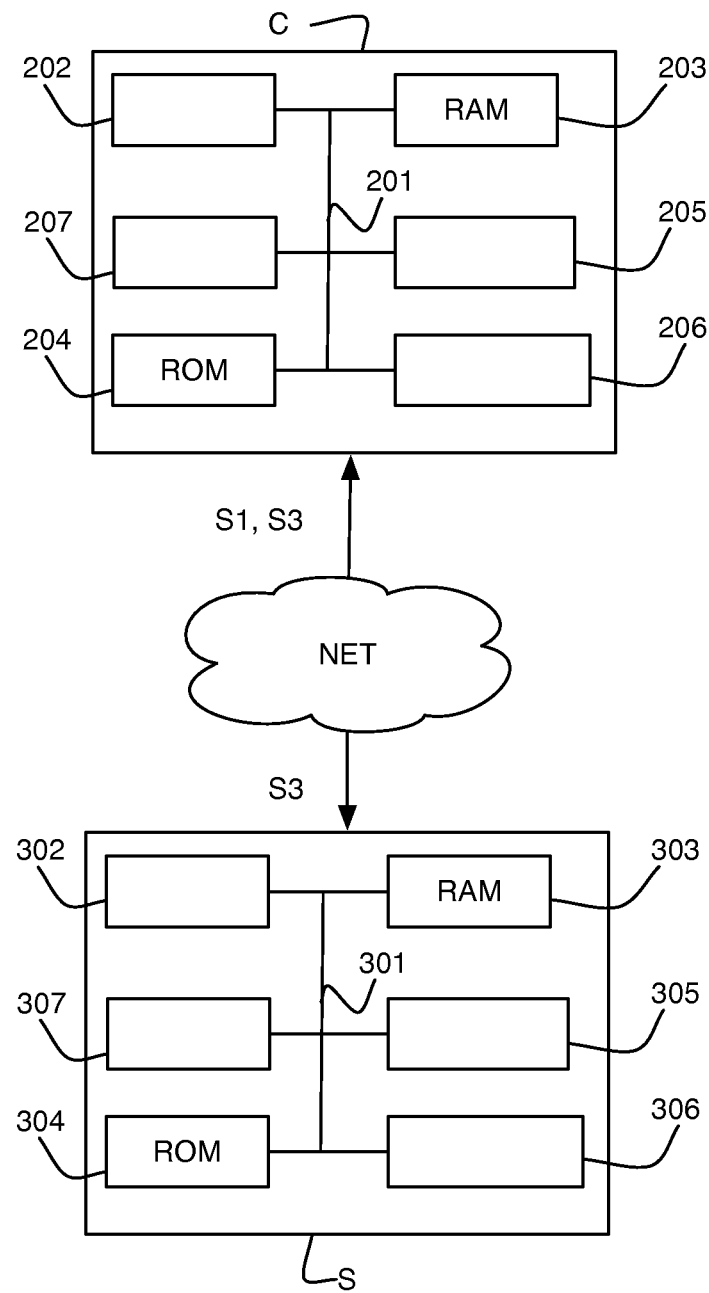
FIG. 2 schematically illustrates the architectures of a client device and of a server device used in a system designed to implement the correction method of FIG. 1.

FIG. 2 illustrates schematically the architectures of the client device C and of the server device S used in a system designed to implement the method described with regard to FIG. 1.

The client device C includes, connected by a communication bus 201:
  a processor, microprocessor, microcontroller or CPU (Central Processing Unit) 202;
  a random access memory RAM 203;
  a read only memory ROM 204;
  a storage medium reader 205 such as an SD card (Secure Digital Card) reader;
  means 206 for interfacing with a communication network NET, such as for example the Internet; and man-machine interface means 207 making it possible for example to manage a touch screen and/or a set of keys. These means 207 are used in particular by the user for manually defining and/or deleting points of interest and/or areas of interest.

The processor 202 is capable of executing instructions loaded in the RAM 203 from the ROM 204, from an external memory (not shown), a storage medium such as an SD card or the like, or a communication network. When the client device C is powered up, the processor 202 is capable of reading instructions from the RAM 203 and executing them. These instructions form a computer program that causes steps 3, 4 and 7 of the method described with regard to FIG. 1 to be implemented by the processor 202.

For this purpose, the processor 202 and the memories 203 and 204 cooperate with the reader 205 in order to obtain the image to be corrected I as well as, according to various embodiments of the method used, a ground elevation model relating to this image I, characteristics relating to the sensor used for acquiring the image I or information relating to this image I.

The processor 202 and the memories 203 and 204 also cooperate with the means 207 that are used, according to one embodiment, by the user for defining a number of points of interest, a quality threshold of the corrected image or a number of areas of interest. The means 207 may also be used for manually defining and/or deleting points of interest and/or areas of interest. These means 207 are also used to form a request for access to an online service provided by the server device S. This request may include in particular metadata such as information relating to the image to be corrected I and characteristics of the sensor that was used for acquiring this image I. On reception of this request, the server device S executes the steps of obtaining areas of interest as described previously as well as the other steps of the method.

The means 206 are designed to receive firstly a signal S1 the frame of which includes information that represents at least one area of interest $ZI_i$ of the reference image IR and secondly a signal S3 carrying parameters of the correction to apply to the image to be corrected.

These means 206 then cooperate with the processor 202 and the memories 203 and 204 in order firstly to extract the areas of interest $ZI_i$ from the signal S1 and secondly the parameters PA of the signal S3. The processor 202 and the memories 203 and 204 also cooperate with these means 206 in order to form and send a signal S2 the frame of which includes information defining at least one image part $P_i$.

The server device S includes, connected by a communication bus 301:
  a processor, microprocessor, microcontroller or CPU (Central Processing Unit) 302;
  a random access memory RAM 303;
  a read only memory ROM 304;
  a storage medium reader 305 such as an SD card (Secure Digital Card) reader;
  means 306 for interfacing with a communication network NET, such as for example the Internet; and
  man-machine interface means 307 making it possible for example to manage a touch screen and/or a set of keys.

The processor 302 is capable of executing instructions loaded in the RAM 303 from the ROM 304, from an external memory (not shown), a storage medium such as an SD card or the like, or a communication network. When the client device C is powered up, the processor 302 is capable of reading instructions from the RAM 303 and executing them. These instructions form a computer program that causes steps 1, 2, 5 and 6 of the method described in relation to FIG. 1 to be implemented by the processor 302.

For this purpose, the processor 302 and the memories 303 and 304 cooperate with the reader 305, and optionally with the means 306, in order to obtain at least one area of interest of the reference image.

The processor 302 and the memories 303 and 304 also cooperate with the means 307, which are used, according to one embodiment, by an expert in order to define a number of points of interest, a quality threshold of the corrected image or a number of areas of interest. The means 307 can also be used to manually define and/or delete points of interest and/or areas of interest.

The processor 302 and the memories 303 and 304 also cooperate with the means 306 in order to form and send firstly the signal S1 and secondly the signal S3.

The processor 302 and the memories 303 and 304 also cooperate with the means 306 in order to receive the signal S2 and extract at least part of the image of this signal.

All or some of the steps of the method described above in relation to FIG. 1 can be implemented in software form by the execution of a set of instructions by a programmable machine, such as a DSP (Digital Signal Processor) or a microcontroller, such as the processors 202 and 302, or be implemented in hardware form by a dedicated machine or component, such as an FPGA (Field-Programmable Gate Array) or an ASIC (Application-Specific Integrated Circuit).

Figure 3:
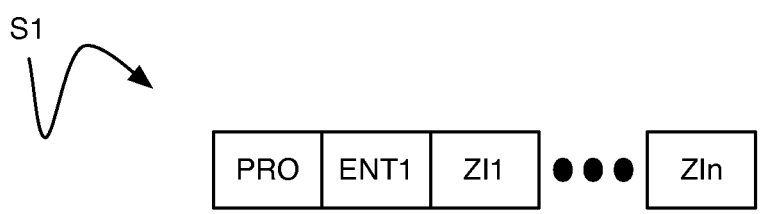
FIG. 3 shows an example of the frame of a signal received by a client device during the correction method of FIG. 1.

FIG. 3 shows an example of the frame of a signal S1 received by the client device C during the method of FIG. 1.

The signal S1 is a signal the frame of which includes information that represents at least one area of interest of the reference image.

This information is in the form of a header ENT1 that specifies the number n of areas of interest and in the form of blocks of information that each relate to one of these n areas of interest ZI1, . . . , ZIn defined on the reference image IR.

This header ENT1 also defines means for accessing the block of information relating to each of these areas of interest. For this purpose, for example, the header ENT1 defines the number of bits used for representing each area of interest.

According to one embodiment, the block of information relating to each area of interest is a ground footprint that can be defined by a list of coordinates of the plane of the reference image IR, by an edge curve or by the coordinates of a single point if the form of this area of interest is known in advance by the client device or included in the header ENT1, or an index of an index table that references all the possible areas of interest that can be defined on the reference image IR. Any other way of representing an area of interest is obviously possible without for all that departing from the scope of the present invention.

Figure 4:
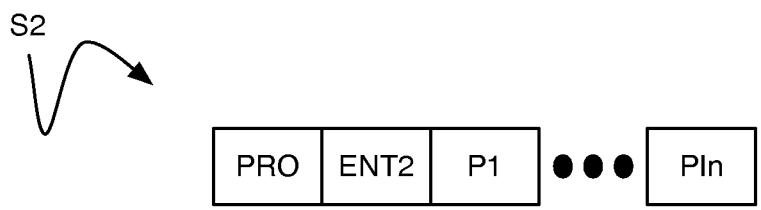
FIG. 4 shows an example of the frame of a signal received by a server device during the correction method of FIG. 1.

FIG. 4 shows an example of the frame of a signal S2 received by a server device during the method of FIG. 1.

The signal S2 is a signal the frame of which includes information that represents at least a part $P_i$ of the image to be corrected, which is delimited by an area of interest $ZI_i$ of the reference image or a part of an image resulting from the image to be corrected and that is delimited by an area of interest $ZI_i$ of the reference image.

This information is in the form of a header ENT2 that specifies the number n of parts of the image and in the form of blocks of information that each relate to one of these n parts of the image P1 . . . Pn defined on the reference image IR.

This header ENT2 also defines means for accessing the block of information relating to each of these image parts. For this purpose, for example, the header ENT2 defines the number of bits used for representing each image part.

According to one embodiment, each block of information represents the value of the pixels of an image part read in a predefined order, for example lexicographical.

The frames of the signals S1 and S2 also include another header relating to the communication protocol used on the network NET so that the client C and server S devices exchange signals. For example the TCP/IP protocol can be used on the network NET, which may for example be of the LAN (Local Area Network) type.

The invention claimed is:

1. A method for correcting a digital image to be corrected stored on a client device by a geometric adjustment of the digital image to be corrected onto a reference image stored on a server device connected to the client device by a communication network, wherein the method includes:
   obtaining, by the server device, at least one area of interest of the reference image,
   sending, to the client device information representative of each area of interest,
   obtaining, by the client device, at least one image part respectively delimited by each received area of interest, each image part being either a part of the digital image to be corrected or a part of an image resulting from the digital image to be corrected,
   sending, to the server device, each obtained image part,
   determining, by the server device, parameters of a correction to apply to the digital image to be corrected, said parameters being determined by geometric adjustment of at least one said image part onto the reference image,
   sending, to the client device, the determined parameters, and
   applying, by the client device, the correction to the digital image to be corrected, said correction using the received parameters and a ground elevation model corresponding to the image to be corrected.

2. The method according to claim 1, wherein at least one area of interest is obtained from a memory of the server or received via the communication network.

3. The method according to claim 1, wherein at least one said area of interest is an area defined around a point of interest that was previously identified on the reference image following an application of a processing to the reference image and/or at least one said area of interest is an area defined around a point of interest that was previously defined manually by a user and/or at least one said area of interest is previously defined manually by a user.

4. The method according to claim 1, wherein the reference image is selected from a plurality of reference images or extracted from a reference mosaic stored in a memory accessible to the server device and from metadata sent by the client device and received by the server device.

5. The method according to claim 4, wherein the metadata at least define information relating to the digital image to be corrected and characteristics of a sensor that was used to acquire the digital image to be corrected.

6. The method according to claim 1, wherein the geometric adjustment of the digital image to be corrected onto the reference image consists of applying a polynomial transformation to this image, and the parameters of the correction are polynomial coefficients of said transformation, said polynomial coefficients being determined by adjusting each said image part onto the reference image.

7. The method according to claim 6, wherein the polynomial coefficients are further determined using ground control points that correspond to points of interest around which the areas of interest are respectively defined, each point of interest being previously identified on the reference image following an application of a processing to the reference image and/or previously defined manually by a user.

8. The method according to claim 7, wherein a quantity of the ground control points and/or a size of each area of interest are constrained by characteristics of a sensor that was used to acquire the digital image to be corrected.

9. The method according to claim 6, wherein the polynomial coefficients are determined using a quantity of ground control points that relate to points extracted from each image part received from the client device, the quantity of ground control points being separated from the quantity of points of interest.

10. The method according to claim 7, wherein the polynomial transformation is an orthorectification.

11. The method according to claim 7, wherein the quantity of ground control points and/or the quantity of areas of interest are parameters chosen by a user.

12. The method according to claim 1, wherein the ground elevation model corresponding to the digital image to be corrected is obtained by the client device either from a local memory or following a reception of a signal sent by the server device.

13. The method according to claim 1, wherein information representative of each area of interest is sent to the client device as soon as said area of interest has been obtained by the server device.

14. The method according to claim 1, wherein the method begins following a reception, by the server device, of a request sent by the client device.

15. The method according to claim 1, wherein said method is performed for geometrically correcting source images from which a True-OrthoImage is generated.

16. A system for correcting a digital image to be corrected by a geometric adjustment of the digital image to be corrected onto a reference image, the system including a server device configured to store the reference image and a client device configured to store the digital image to be corrected, the server and client devices configured to be connected together by a communication network, wherein the server device is configured for:
   obtaining at least one area of interest of the reference image,
   sending to the client device information representative of each area of interest of the reference image,
   receiving from the client device at least one image part respectively delimited by each received area of interest, said image part being either a part of the digital image to be corrected or a part of an image resulting from the digital image to be corrected,
   determining parameters of a correction to apply to the digital image to be corrected, said parameters being determined by geometric adjustment of at least one said image part onto the reference image, and
   sending the determined parameters to the client device,
   and wherein the client device is configured for:
   receiving from the server device the information representative of each area of interest of the reference image,
   obtaining each said image part,
   sending to the server device each obtained image part, and
   receiving from the server device the parameters of the correction to apply to the digital image to be corrected, and
   applying the correction of the digital image to be corrected, said correction using the received parameters and a ground elevation model corresponding to the digital image to be corrected.

17. A method for correcting a digital image to be corrected stored on a client device by a geometric adjustment of the digital image to be corrected onto a reference image stored on a server device connected to the client device by a communication network, wherein the server device performs:
    obtaining at least one area of interest of the reference image,
    sending, to the client device information representative of each area of interest,
    receiving, from the client device, at least one image part respectively delimited by each area of interest, each image part being either a part of the digital image to be corrected or a part of an image resulting from the digital image to be corrected,
    determining parameters of a correction to apply to the digital image to be corrected, said parameters being determined by geometric adjustment of at least one said image part onto the reference image, and
    sending, to the client device, the determined parameters.

18. A method for correcting a digital image to be corrected stored on a client device by a geometric adjustment of the digital image to be corrected onto a reference image stored on a server device connected to the client device by a communication network, wherein the client device performs:
    receiving, from the server device, information representative of at least one area of interest of the reference image,
    obtaining at least one image part respectively delimited by each received area of interest, each image part being either a part of the digital image to be corrected or a part of an image resulting from the digital image to be corrected,
    sending, to the server device, each obtained image part,
    receiving, from the server device, parameters of a correction to apply to the digital image to be corrected, and
    applying a correction on the digital image to be corrected, said correction using the received parameters and a ground elevation model corresponding to the image to be corrected.

19. A server device in a system for correcting a digital image to be corrected stored on a client device by a geometric adjustment of the digital image to be corrected onto a reference image stored on the server device, the server device configured to be connected to the client device by a communication network, wherein the server device is configured for:
    obtaining at least one area of interest of the reference image,
    sending, to the client device information representative of each area of interest,
    receiving, from the client device, at least one image part respectively delimited by each area of interest, each image part being either a part of the digital image to be corrected or a part of an image resulting from the digital image to be corrected,
    determining parameters of a correction to apply to the digital image to be corrected, said parameters being determined by geometric adjustment of at least one said image part onto the reference image, and
    sending, to the client device, the determined parameters.

20. A client device in a system for correcting a digital image to be corrected stored on the client device by a geometric adjustment of the digital image to be corrected onto a reference image stored on a server device, the client device configured to be connected to the server device by a communication network, wherein the client device is configured for:
    receiving, from the server device, information representative of at least one area of interest of the reference image,
    obtaining at least one image part respectively delimited by each received area of interest, each image part being either a part of the digital image to be corrected or a part of an image resulting from the digital image to be corrected,
    sending, to the server device, each obtained image part,
    receiving, from the server device, parameters of a correction to apply to the digital image to be corrected, and
    applying a correction on the digital image to be corrected, said correction using the received parameters and a ground elevation model corresponding to the image to be corrected.

* * * * *